Jan. 28, 1941.  G. W. OREMUS  2,229,669
METHOD OF MAKING NIPPLES FOR PIPE UNIONS FOR COUPLING SECTIONS OF PIPES
Filed Sept. 18, 1939  3 Sheets-Sheet 1

INVENTOR
Gordon W. Oremus
BY Popp & Popp
ATTORNEYS

Jan. 28, 1941.　　　　　G. W. OREMUS　　　　　2,229,669
METHOD OF MAKING NIPPLES FOR PIPE UNIONS FOR COUPLING SECTIONS OF PIPES
Filed Sept. 18, 1939　　　3 Sheets-Sheet 2
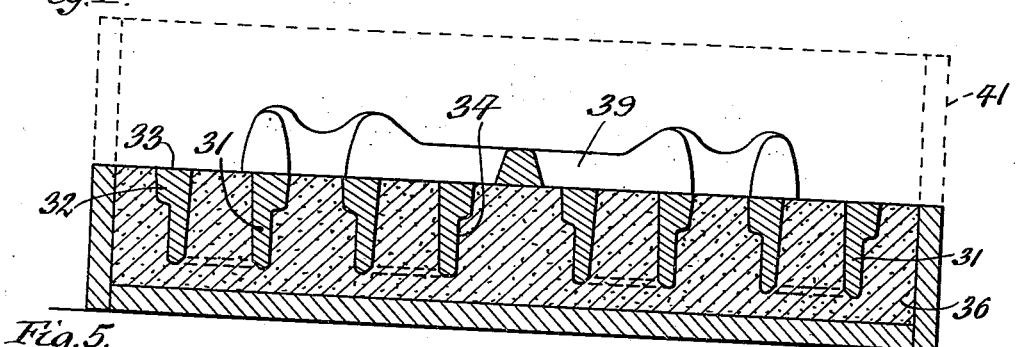
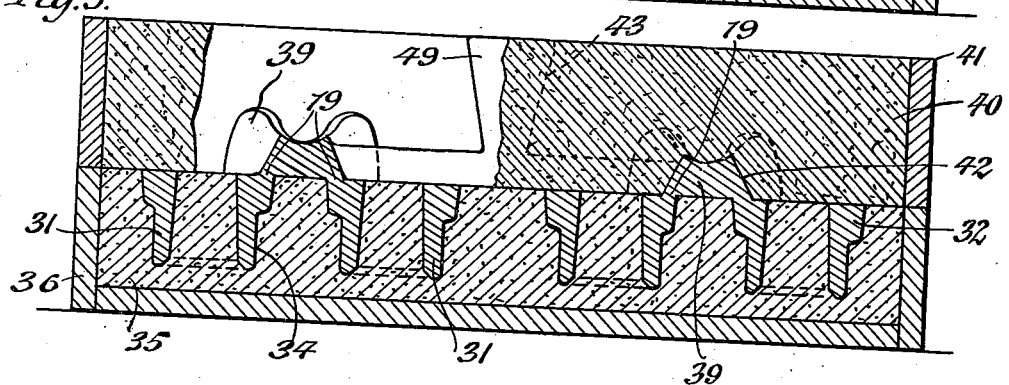
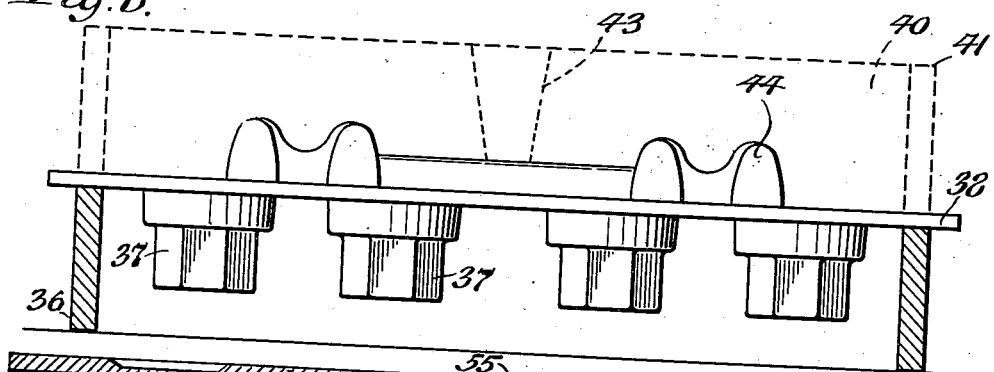
INVENTOR
Gordon W. Oremus,
BY Popp & Popp
ATTORNEYS Jan. 28, 1941.  G. W. OREMUS  2,229,669
METHOD OF MAKING NIPPLES FOR PIPE UNIONS FOR COUPLING SECTIONS OF PIPES
Filed Sept. 18, 1939   3 Sheets-Sheet 3
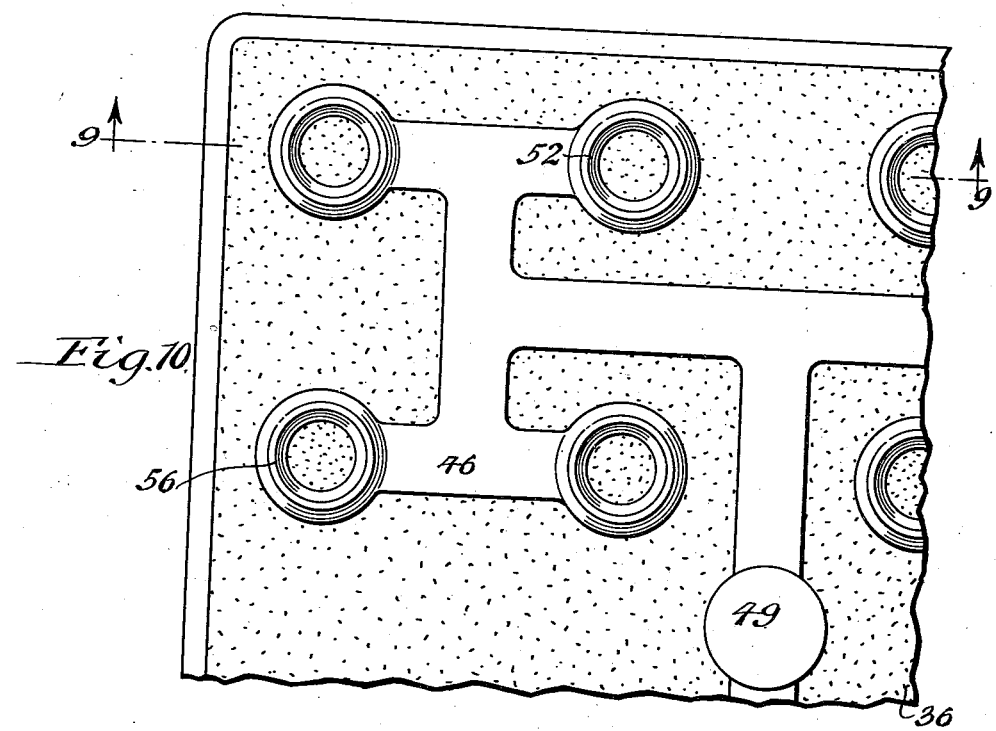
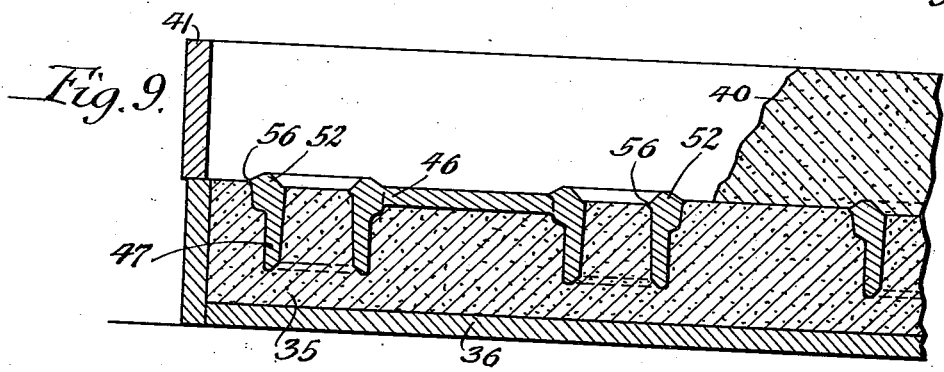
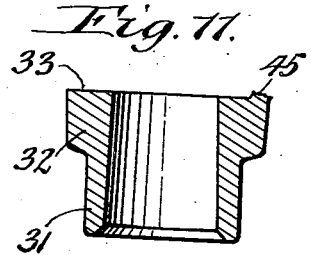
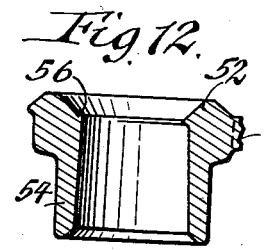
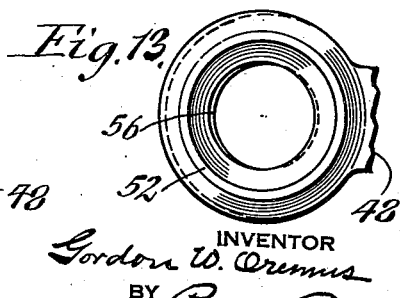
INVENTOR
Gordon W. Oremus
BY Popp & Popp
ATTORNEYS Patented Jan. 28, 1941

2,229,669

UNITED STATES PATENT OFFICE 2,229,669

METHOD OF MAKING NIPPLES FOR PIPE UNIONS FOR COUPLING SECTIONS OF PIPES

Gordon W. Oremus, Medina, N. Y.

Application September 18, 1939, Serial No. 295,374

1 Claim. (Cl. 29—157)

This invention relates to a method of making male and female nipples for pipe unions or couplings.

Heretofore two different forms of metal tubular blanks were cast from which male and female connecting nipples for pipe unions were subsequently made, each male blank being provided on its front end with a projection and each female member being provided on its front end with a recess adapted to receive the projection of the companion male member. When casting such blanks one match plate was employed having patterns on one side for producing mold cavities in the drag of the molding flask in which were cast the bodies of nipples and the sprues connecting therewith and patterns on its opposite side for producing mold cavities in the cope in which the male ends for the respective nipple were cast; and another match plate was employed having patterns on one side for producing mold cavities in the drag in which were cast the bodies of the nipples and the sprues connecting therewith and patterns on its opposite side for producing mold cavities in the cope in which the female ends for the last mentioned bodies were cast.

When producing the mold cavities in the flask in this manner, the metal runway was formed in the opposing parts of the sand of the drag and cope so that the molten metal entered the mold cavities on the peripheral side thereof adjacent to the upper end thereof.

This method of producing these tubular nipple blanks has been found unsatisfactory not only on account of the undue expense involved in making the same in this manner but also on account of the limited number of such castings which can be produced in a molding flask at any one time, also the expense of grinding off the fins or burrs which are left on the outer side of the blanks, also the necessity of sorting, selecting and counting the two kinds of nipples preparatory to machining them to produce complementary male and female members for each union or coupling and also the excessive number of defective castings which are produced due to the frequent misalinement of the drag and cope of the flask before the metal is poured so that a large number of castings must be rejected and remelted as scrap.

It is the object of this invention to provide a method of casting tubular blanks for male and female members of pipe unions in which the above mentioned objections are eliminated and these castings can be produced at lower cost, also to permit of casting a larger number of tubular blanks within a given size of flask, also to avoid the production of defective cast tubular blanks due to misalinement between the drag and cope of the flask, and also to cause the metal to be poured into the mold cavities from the upper or front ends of the same so that the formation of fins or burrs at the side of the castings is avoided but instead causes these fins or burrs to be formed on the front end of the castings where they are removed during the operation of machining the front ends of these castings for converting them either into male or female union members, also to make the cast blanks of uniform shape so that the same blanks can be converted into either male or female members of a union, also to avoid the necessity of sorting or counting these blanks according to whether they shall be used for making male or female nipples, and also to avoid the expense of any separate grinding operation for removing any fins or burrs from the sides of the cast blanks.

In the accompanying drawings:

Fig. 4 is a vertical cross section of the same taken on line 4—4, Fig. 2 and showing the cast blanks within the drag, but the cope removed.

Fig. 5 is a vertical longitudinal section of the same taken on line 5—5, Fig. 2 and showing the cope assembled with the drag of the flask.

Fig. 6 is a vertical section showing the drag of the flask in full lines and the cope thereof in dotted lines and a match plate arranged between the drag and cope and provided on one of its opposite sides with the article pattern for a plurality of tubular blanks projecting into the drag and on its opposite side with the sprue pattern projecting into the cope in accordance with this invention.

Fig. 7 is a fragmentary sectional elevation of an old type match plate in which the pattern for the body portion of the article to be cast and the sprue connecting therewith are arranged on one side of the match plate and project into the drag while the opposite side of the match plate is provided with a pattern which projects into the cope for forming male ends on these cavities in accordance with the method heretofore in use.

Fig. 8 is a similar view showing the match plate provided on its opposite sides with patterns whereby body cavities and female end cavities are produced in the drag and cope of the flask for casting female union blanks in accordance with the method heretofore in use.

Fig. 9 is a fragmentary vertical section of a molding flask showing the manner in which defective tubular nipples are cast by the use of the patterns shown in Fig. 7.

Fig. 10 is a fragmentary plan view of the drag and the castings therein shown in Fig. 9.

Fig. 11 is a longitudinal section showing the superior form of cast tubular nipple blank made in accordance with this invention.

Fig. 12 is a similar view of a defective union nipple made in accordance with the methods heretofore in use.

Fig. 13 is a plan view of the nipple shown in Fig. 12.

Figure 1:
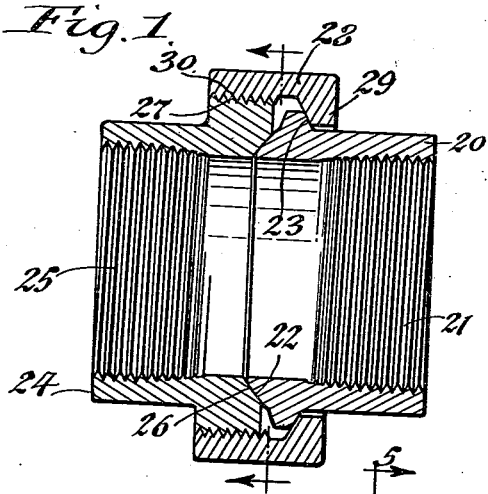
Fig. 1 is a longitudinal section of a complete pipe union or coupling of which the male and female tubular connecting nipples may be made in accordance with this invention.
Figure 2:
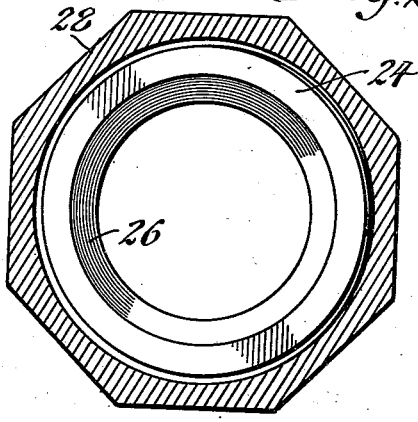
Fig. 2 is a cross section taken on line 2—2, Fig. 1.

In the following description similar characters of reference indicate like parts in the several figures of the drawings:

Figs. 1 and 2 illustrate a pipe union or coupling which is of the type now in common use for detachably connecting the opposing ends of two sections of piping and which embodies nipples made in accordance with the present invention. As there shown the numeral 20 represents the male tubular nipple which is adapted to be connected at its rear or outer end by means of an internal screw thread 21 or otherwise with one pipe section which is to be coupled and provided at its inner end or face with an annular male bead or projection 22 and with an external shoulder or collar 23.

The numeral 24 represents a similar tubular nipple which is adapted to be connected at its outer or rear end by means of an internal screw thread 25 or otherwise with another section of the piping which is to be coupled and provided at its inner or front face with a female socket or annular recess 26 adapted to be engaged by the projection or bead 22 on the companion male nipple. The front peripheral part of this female nipple is provided with an external screw thread 27 which is of larger diameter than the collar 23 of the male nipple.

The numeral 28 represents a coupling sleeve surrounding the opposing ends of the male and female nipples and provided at one end with an inwardly projecting annular bearing flange 29 which engages with the collar 23 of the male nipple while the opposite end of the same is provided with an internal screw thread 30 engaging with the screw thread 27 of the female nipple.

Upon tightening this coupling sleeve 28, the male and female formation on the opposing front ends of these nipples are pressed together and a tight joint is formed therebetween in a well known manner.

Although the male and female nipples of this coupling in their finished or completed condition are unlike at their front or cooperating surfaces, the same are produced in accordance with the present invention from blanks which are identical in construction. A plurality of such blanks are preferably produced of cast metal by pouring molten metal into a plurality of cavities which are formed in the opposing parts of the drag 36 and cope 41 of a molding flask. Each of these tubular blanks, as shown in Figs. 4, 5, and 11, comprises a cylindrical or tubular body 31 which is provided on its front part with an external annular collar 32 having a front end face 33 which is arranged in a plane at right angles to the axis of this body.

The bodies 34 of the mold cavities for the casting of these tubular body blanks or articles are formed in the sand 35 in the drag 36 of the molding flask by means of a plurality of body or article patterns 37 which are arranged on one side of a match plate or pattern plate 38. These molding cavities are formed in this sand of the drag in the usual and well known manner of producing molding cavities of this character with the exception that the article patterns 37 for the nipple bodies 31 are arranged wholly on one side of the match plate and the latter engages with the upper edge of the drag of the flask and the upper or front end of each pattern 37 terminates flush with the top of the drag so the body patterns project into the drag, as shown in Fig. 6.

On its opposite side the match plate or pattern plate 38 is provided with a sprue pattern 44 which is adapted to be embedded in the molding sand 40 contained within the drag 41 of the molding flask for the purpose of forming therein the conduits, runners, or sprueways 42 through which the molten metal is conducted to the several mold cavities. After the impression of the article pattern and the sprueway pattern have been produced in the respective opposing parts of the sand in the flask the match plate is removed and the drag and cope are reassembled so that the face of the sand in the cope extends over the upper or front ends of the mold cavities in the drag and completes the same and the metal conduits or sprueways in the cope communicate with the several mold cavities. It is, of course, understood that the sand in the cope is provided with a usual sprue inlet or passage 43 through which the molten metal is introduced into the flask preparatory to distributing the same by means of the runners or conduits 42 to the several mold cavities, and that a sprue stem 49 is left in this sprue inlet when the casting operation has been completed and forms part of the scrap metal to be remelted.

These metal conduits or sprueways only communicate with the upper or front ends of the several mold cavities in the drag so that when the casting is completed the hardened sprue metal connects with the several tubular blanks only on the front ends or faces thereof, as shown at 19 in Fig. 5. Due to this manner of pouring the metal into the front transverse ends of the mold cavities, the fin or burr formed on the cast tubular blanks upon breaking off the sprue or waste metal from these blanks will only be left on the front transverse ends of the same, as indicated at 45 in Fig. 11.

After these cast blanks are removed from the molding flask they are broken from the cast sprue 39 which connects them and as the blanks are of identical shape no special care is required to sort, count or select them as would be necessary if the blanks were of different form and had to be matched for use as male or female union nipples in accordance with the method heretofore in use.

After the nipple blanks have been thus cast of uniform shape the same can be converted either into finished male blanks each of which has a projection 22 at the front end thereof, or into female blanks each of which has a socket or recess 26 at its front end, these different formations on the front ends of the male and female nipples being produced by machining or finishing apparatus of well known construction.

During the operation for finishing or machining the front ends of the nipple blanks for converting them into either male or female members of a pipe union or coupling, the fins or burrs 45, which were left on the front ends of these blanks after the casting and separating operation, are removed by these same machining and finishing operations. It will therefore be evident that no separate operation is required for removing these fins or burrs from the tubular nipple blanks by grinding, chipping or otherwise and that the cost of such a separate operation is therefore wholly eliminated.

Owing to the formation of the mold cavities between the drag and cope of the molding flask so that the metal is poured into each mold cavity at the front face thereof, it is possible to form a larger number of mold cavities in the same size of flask than has been possible in the method heretofore used for casting a plurality of union nipples. Heretofore the metal for producing the nipple blanks was poured into the mold cavities on the peripheral side thereof adjacent to the front ends of these cavities, as shown in Figs. 9 and 10, where the sprue 46 is connected with the tubular nipple blank 47 at the side thereof so that upon breaking this nipple from the sprue a fin 48 is left which projects laterally from the side of the cast tubular blank, as shown in Figs. 12 and 13. When fins are left on the sides of the tubular blanks in this manner a separate operation, such as grinding, is required to remove these fins from the blanks in addition to the operation of machining the front ends of the blanks for converting them either into male or female nipples.

By constructing the tubular blanks all of the same form so that they can be converted into either male or female union nipples the front end of the cast blank can be left perfectly flat and on a plane at right angles to the axis of the nipple, thereby enabling the entire body of the nipple blanks to be cast wholly in the drag of the flask and not only simplify the construction of the pattern but also facilitate the assemblage of the members of the flask and insure the production of perfect cast blanks at all times.

When producing cast metal male and female nipple blanks which differ in shape at the front faces or ends thereof it has been the practice heretofore to provide separate pattern plates for the main part or body of the nipple blanks and for the differences in the end formation thereof. For example, as shown in Fig. 8, the pattern or match plate 50 is provided on one side with patterns 51 for producing the bodies of the nipple blanks while its opposite side is provided with pattern formations 52 for producing female recesses or sockets in the respective nipple blanks, while the pattern 53, shown in Fig. 7, is provided on one side with patterns 54 for producing the bodies of these nipples and the other side thereof is provided with pattern formations 55 for producing the projection or annular bead 52 on the male member or nipple of the union. It is therefore apparent that by forming the entire pattern of the nipple to be cast on one side of the match plate and the pattern formation for the conduit runners or sprueways for the metal on the opposite side thereof that one of these match plates with the appropriate pattern formation thereon will serve for casting both male and female union nipples, thereby saving the expense of one of the match plates heretofore employed for the formation of two kinds of nipple blanks for completing a union.

When forming a part of each mold cavity in the drag and another part in the cope of the flask in order to complete the cavity for the production of a cast nipple, great care must be exercised in alining the drag end cope, otherwise the cast blanks produced in these mold cavities will be out of shape and produce defective castings. For example, as shown in Fig. 9, the upper section or cope 41 of the flask is slightly offset horizontally from the lower section or drag 36 of the flask, whereby that part of the mold cavity which produces the male projection 52 on the front end of each blank 47 would be slightly offset from that part of the mold cavity which is arranged in the drag. When such misplacement of the drag end cope occurs the body portion 47 and the end face portion 52 of the same will be eccentric relative to each other, as shown at 56 in Figs. 9, 12 and 13, and therefore necessitate discarding these castings as being defective and not only reducing the output of good castings but also incurring the additional expense of recasting these defective blanks as scrap metal. Such misalinement of the two parts of each mold cavity is liable to occur unless the molder exercises great care in assembling the two parts of the molding flask and it is practically unavoidable when the cooperating guide pins and eyes of the two sections of the molding flask become worn from use.

In the present invention it is immaterial whether the drag and cope are in exact alinement inasmuch as the entire body of each mold cavity in which the metal blank is cast is wholly in the drag portion of the flask and only the metal conduit, sprueway, or runner which supplies the metal to the mold cavities is formed in the cope so that it is immaterial whether the sprueway is exactly in a certain position because it merely supplies the metal to the mold cavities and in nowise influences the shape of the metal blanks which are cast in the mold cavities.

Figure 3:
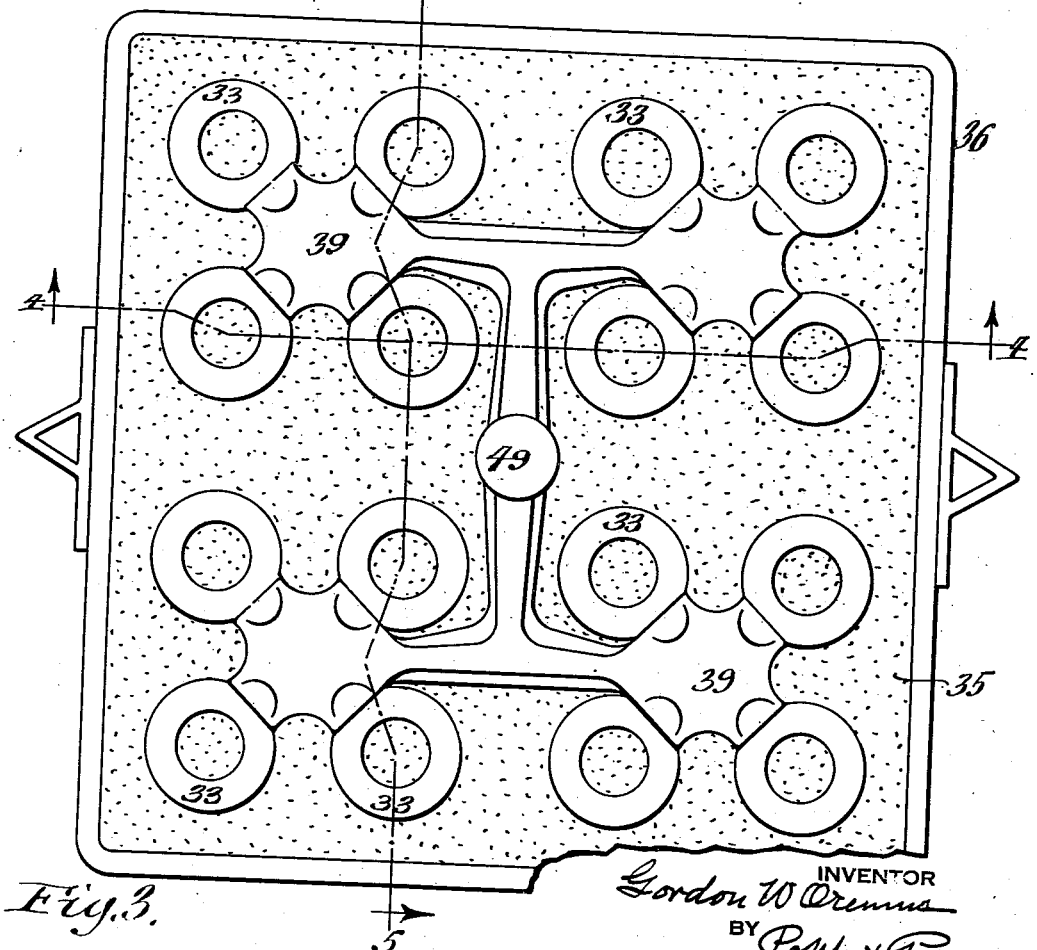
Fig. 3 is a top plan view of the drag of a molding flask showing a plurality of nipple blanks cast therein in accordance with this invention.

When supplying the molten metal to the mold cavities at the sides of the latter it is necessary to place the metal runways in the drag between the mold cavities, as shown in the old type of mold in Fig. 9, whereby fewer mold cavities of a given size can be formed in a given flask, as compared with the present improvement in which a larger number of mold cavities can be formed in the same area because the location of the metal runway in the cope and the feeding of the metal into the upper ends of the mold cavities permits the latter to be placed closer together and therefore enables more castings to be produced in a given size of flask, thereby materially reducing the cost of manufacture. This increase in the number of castings which can be produced according to the present invention will be apparent by a comparison of Figs. 3, 4 and 5 showing the large number of castings which can be produced in a flask by using the present improved method, and Figs. 9 and 10 showing the small number of castings produced in a flask by the methods heretofore employed.

It will be obvious from the foregoing that considerable saving is effected by the use of this invention due to the elimination of separate grinding of fins or burrs from the cast blanks in order to complete the same as nipples for use in unions, and that only one-half the usual number of match plates are required because one match plate is used for making one kind of blanks instead of using separate match plates for making male and female blanks. The formation of the blanks of uniform shape in accordance with this invention also avoids the necessity of exercising care in producing the requisite number of male or female blanks and counting or sorting them for determining whether the required number of pairs of these blanks have been made. Moreover, the production of scrap metal due to defective castings is virtually eliminated inasmuch as it is impossible to produce defective castings by misalining the two parts of the molding flask, thereby obtaining a greater yield of perfect castings from a certain amount of metal than has been possible heretofore and reducing the cost of manufacturing articles of this character accordingly.

I claim as my invention:

The hereindescribed method of producing cooperating male and female nipples for pipe unions which consists in preparing a mold for casting nipple blanks of identical form and in which the mold cavities for the sides and rear ends of the nipples are formed wholly in the drag of the mold, and only the front ends of the mold cavities and the metal pouring sprueways are formed in the cope of the mold; pouring molten metal through the sprueways in said cope and into the mold cavities of the drag and producing nipple castings of identical form, each of which has a fin only on its front end; machining the front ends of some of said castings and removing the fins therefrom and forming the front ends of the respective castings into female faces; and machining the front ends of others of said nipple castings and removing the fins therefrom and forming the front ends of these last mentioned castings into male faces which are adapted to fit the complementary female faces of the companion nipple castings.

GORDON W. OREMUS.